2 Sheets—Sheet 1.

L. B. SILVER.

COMBINED CHIMNEY AND VENTILATOR.

No. 7,766. Reissued June 26, 1877.

WITNESSES

H. L. Perrine

A. W. Bright

Lovern B. Silver.

INVENTOR

By Seegott and Seegott.

ATTORNEYS.

2 Sheets—Sheet 2.

L. B. SILVER.

COMBINED CHIMNEY AND VENTILATOR.

No. 7,766. Reissued June 26, 1877.

WITNESSES
H. L. Perrine
A. W. Bright

Lovern B. Silver.
INVENTOR

By Seegqett and Seegqett
ATTORNEYS.

UNITED STATES PATENT OFFICE.

LOVERN B. SILVER, OF CLEVELAND, OHIO.

IMPROVEMENT IN COMBINED CHIMNEY AND VENTILATOR.

Specification forming part of Letters Patent No. 159,285, dated February 2, 1875; reissue No. 7,766, dated June 26, 1877; application filed April 10, 1877.

*To all whom it may concern:*

Be it known that I, LOVERN B. SILVER, of Cleveland, county of Cuyahoga, and State of Ohio, have invented a new and Improved Combined Heating and Ventilating Apparatus; and declare the following to be a full, clear, and exact description of the same, such as will enable others skilled in the art to make and use it, reference being had to the accompanying drawings, which form a part of this specification.

The object of my invention is to utilize the heat from the back of the grate, and the heat which would otherwise pass from the top of the chimney; also, to heat and ventilate the rooms adjacent to the chimney-flue.

My invention consists in the construction and arrangement of parts, as hereinafter set forth and claimed.

Figure 1:
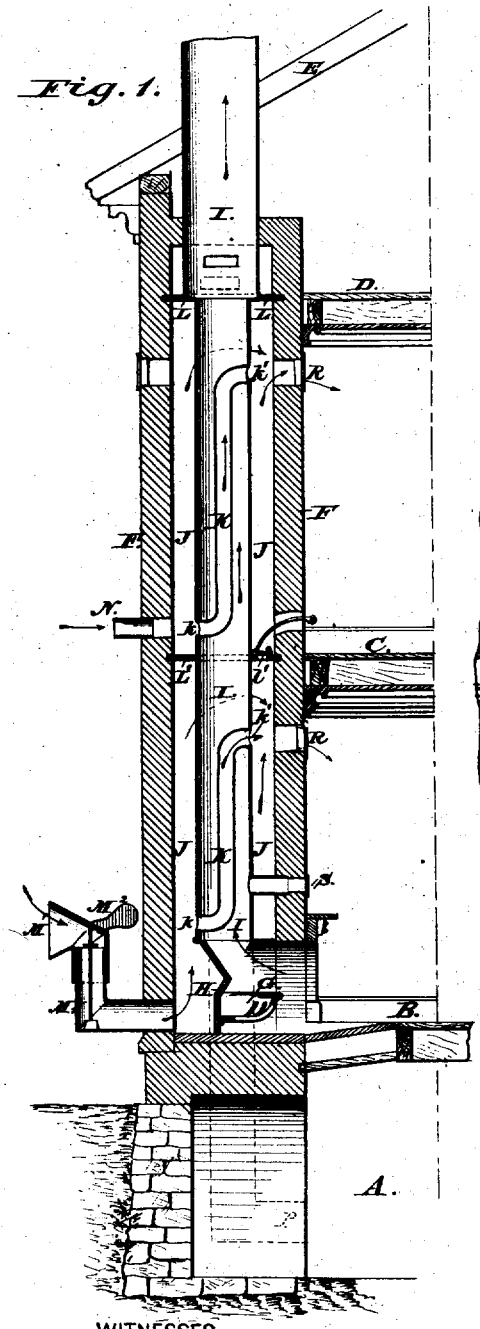
Figure 2:
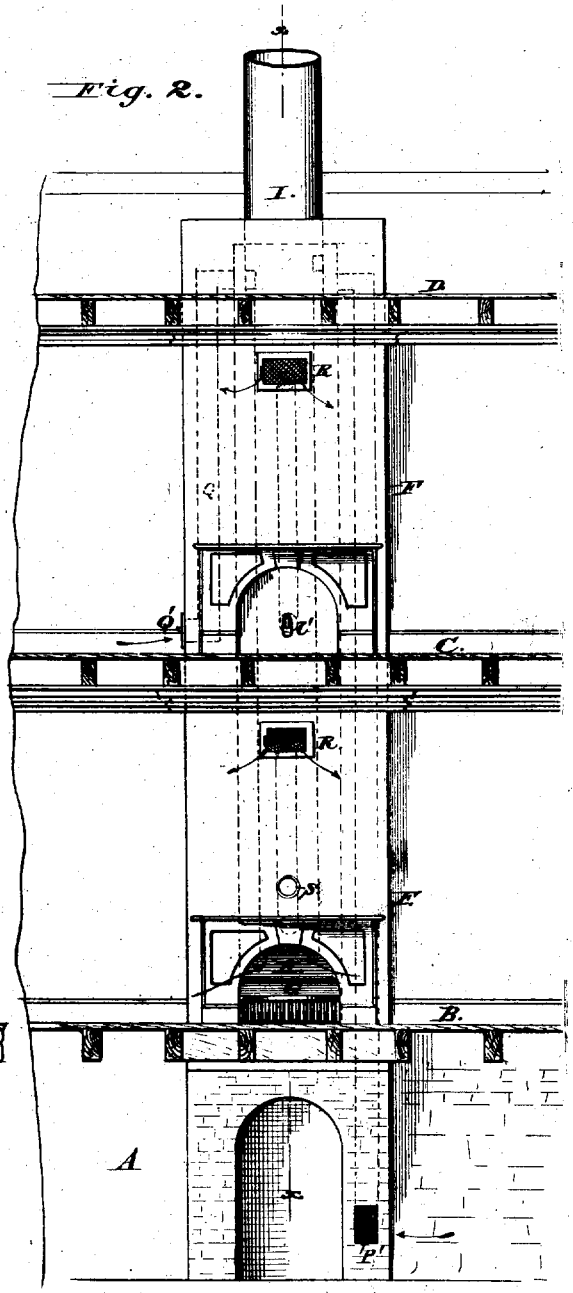
Figure 3:
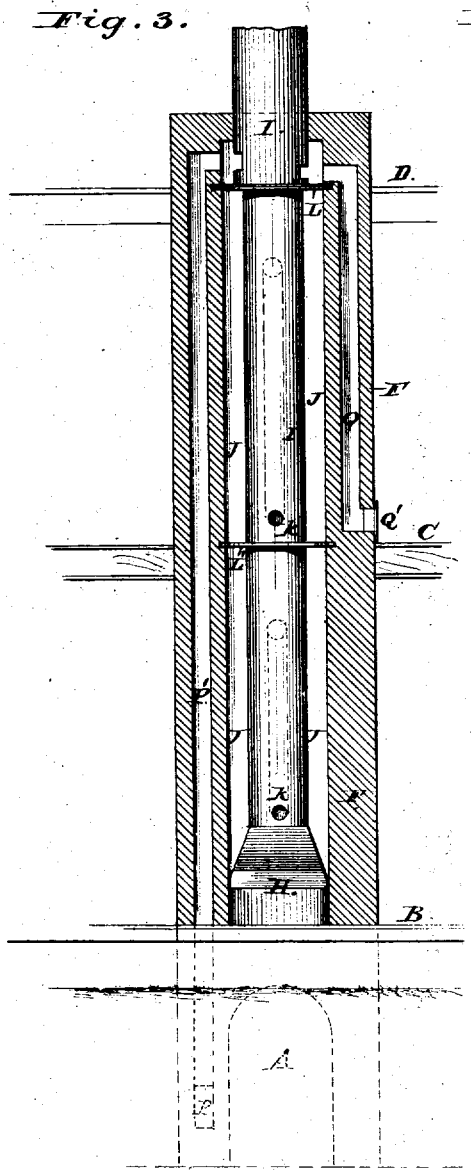
Figure 4:
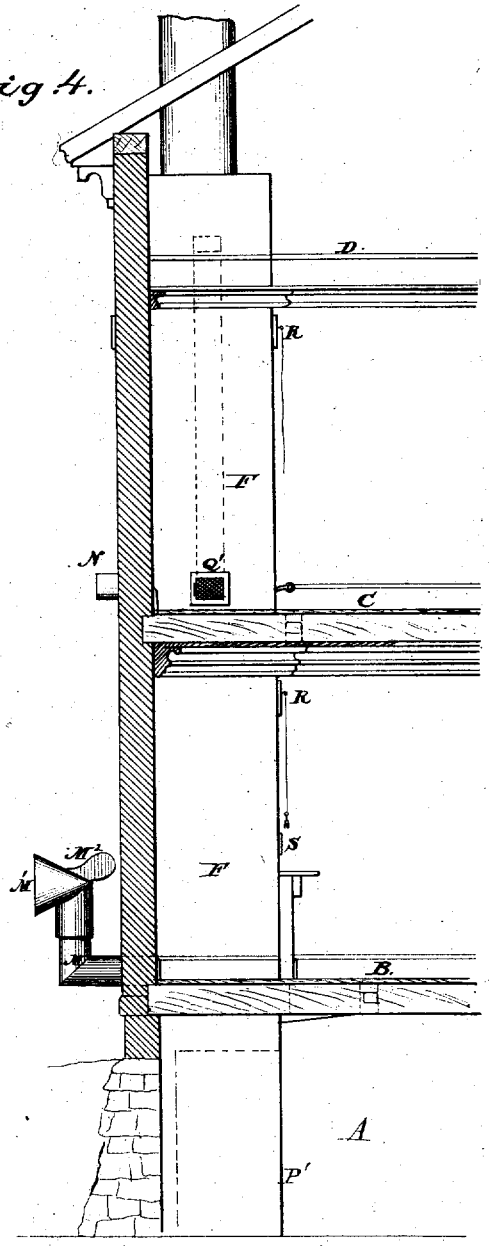

In the drawings, Figure 1 is a longitudinal central section exhibiting my invention. Fig. 2 is a front elevation of the chimney viewed from within the building. Fig. 3 is a rear elevation, showing the chimney opened so as to exhibit the smoke-flue. Fig. 4 is a side elevation of the chimney-flue.

A is the cellar apartment. B is the first floor; C, the second floor; D, the garret floor; E, the roof. F is the chimney. G is the fire-place; H, the back of the grate; I, the smoke-flue, through which the products of combustion rise and pass from the top of the chimney. J is an air-space surrounding the fire-place, and extending up around the smoke-flue. K K are small flues within the main flue I, and having openings *k k'* communicating with the air-space J. L is a partition, L' another partition. L' is provided with a valve or damper, *l'*, within the air-space J. M is a pipe or channel, for introducing air from without, and may or may not be provided with a funnel, $M^1$, and vane $M^2$, for directing the air into the air-space J. N is another opening to the external air. P is an opening in one of the supporting pillars in the cellar. An independent flue leads therefrom up through the air-space J and into the chimney above the upper floor, for ventilating the cellar. This flue is shown at P' in Fig. 3. Q is a similar ventilating-flue, leading from the second floor from a register, Q', and the grate on the first floor serves as a ventilator.

The operation of the device is as follows: A fire existing in the grate heats the back of the grate, and the heat so radiated is communicated to the air in the air-space. The heated products of combustion pass up through the smoke-flue I, and, in passing, the heat is radiated outward and communicated to the air in the air-space J. Also, in passing up through the smoke-flue these products of combustion give off considerable of their heat to the pipes K, and an upward current is established through these pipes as the heated air rises. Fresh air from outside passes into the air-space J through the pipes M and N. The air becoming heated in the air-space J, from its tendency to rise, is expelled into the rooms through the register R. The heat therefrom is given off in the apartment, and the air descends to give place to warmer air that follows it. As it descends it displaces the cooler and impure air near the floor of the apartment, and that air passes off through the grate or through the ventilator Q', if in an upper apartment.

In this way it is apparent that a circulation is maintained in the room from the ceiling to the floor; that a perfect circulation and ventilation is maintained, and that nearly all, if not all, the heat is utilized.

It is apparent that the heat which is radiated from the smoke-flue and from the grate is utilized in heating the incoming air, while at the same time the products which usually escape through the smoke-flue in like manner have their heat extracted by that portion of the external air that passes through the interior pipe K, and the air thus heated by external radiation from the smoke-flue and that which is heated in the pipe K within the smoke-flue, are again brought together and commingle before passing into the room through the registers R, having been heated solely by heat that is ordinarily wasted. And it is also apparent that I have utilized not only the heat that is radiated from the outside of the smoke-flue, but also the heat that rises through the smoke-flue, both for heating the same volume of air, viz, that air that has entered the air-space J.

The heat may be rendered more effective in the lower rooms by closing the valve $l'$. In that event it would be necessary to have the air-pipe N enter above the partition L′ in order to heat the rooms on the second floor.

In case a stove-pipe is employed instead of a grate, the pipe should enter the chimney at a point, S, as low down as practicable, in order that as much as possible of its waste heat may be extracted.

It will be seen that the inside pipes K open at $k$ $k'$ into the air-space.

In order that the best results may be attained, it is preferable that the smoke-flue I should be made of good conducting material, in order to radiate the greatest amount of heat, and that the outer flue F should be made of non-conducting material. The partition L prevents the upward escape of the heated air.

This device may be applied to any number of stories.

It will be observed that the opening P and the independent ventilating flue P′, as well as register Q′ and the ventilator Q, do not enter the smoke-flue, except near the top of the chimney, and, therefore, while the adjacent heat of the chimney-flue, as well as the small amount of heat remaining in the products of combustion, serve to create a sufficient upward draft through the ventilating-flues, yet the cold air from the ventilating-flue is not brought into the smoke-flue to chill its contents until the contents of the smoke-flue have arisen too far to be available for heating purposes.

What I claim is—

1. The combination, with a fire-place and a smoke-flue connected therewith, said smoke-flue provided with one or more diagonal pipes, K, of an exterior air-flue, having partitions governed by dampers or valves located therein, said partitions arranged in close proximity to the ceilings and air-registers, substantially as described.

2. The combination, with a fire-place and a smoke-flue connected therewith, of an exterior air-flue, having partitions governed by dampers or valves located therein, said partitions arranged in close proximity to the ceilings of the house, and air-registers leading to the hot-air flue at a point below said partitions, substantially as set forth.

3. The combination, with a fire-place and smoke-flue connected therewith to constitute an air-place around the fire-place and smoke-flue, of an air-pipe leading to the air-flue near the fire-place, a pipe passing diagonally upward through the smoke-flue, and a register located near the ceiling, substantially as set forth.

4. The combination, with a chimney, of an interior smoke-flue, an exterior air-flue partition, L′, and valve $l'$, substantially as and for the purposes described.

5. The combination, with a chimney, of an interior smoke-flue surrounded by an exterior air-flue, register R, entering the apartment near the ceiling, and ventilators Q Q′, leaving the apartment near the floor, and entering the smoke-flue near the top of the building, substantially as and for the purposes described.

LOVERN B. SILVER.

Witnesses:

WELLS W. LEGGETT,

FRANCIS TOUMEY.